United States Patent
Fujii et al.

(10) Patent No.: US 12,215,399 B2
(45) Date of Patent: Feb. 4, 2025

(54) NON-ORIENTED ELECTRICAL STEEL SHEET AND METHOD FOR PRODUCING SAME

(71) Applicant: NIPPON STEEL CORPORATION, Tokyo (JP)

(72) Inventors: Hiroyasu Fujii, Tokyo (JP); Jun Maki, Tokyo (JP); Kazutoshi Takeda, Tokyo (JP); Hiroyuki Mimura, Tokyo (JP); Yusuke Kanto, Tokyo (JP); Shuichi Yamazaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 615 days.

(21) Appl. No.: 17/440,646

(22) PCT Filed: Apr. 17, 2020

(86) PCT No.: PCT/JP2020/016809
§ 371 (c)(1),
(2) Date: Sep. 17, 2021

(87) PCT Pub. No.: WO2021/210149
PCT Pub. Date: Oct. 21, 2021

(65) Prior Publication Data
US 2022/0316022 A1    Oct. 6, 2022

(51) Int. Cl.
*C21D 8/12* (2006.01)
*H01F 1/18* (2006.01)

(52) U.S. Cl.
CPC ............. *C21D 8/1283* (2013.01); *H01F 1/18* (2013.01)

(58) Field of Classification Search
CPC ................................ C21D 8/1283; H01F 1/18
See application file for complete search history.

(56) References Cited

U.S. PATENT DOCUMENTS

| | | | | |
|---|---|---|---|---|
| 5,945,212 A | * | 8/1999 | Tanaka | C23C 22/74 427/398.1 |
| 2009/0324837 A1 | | 12/2009 | Han et al. | |
| 2016/0111182 A1 | * | 4/2016 | Sashi | H01B 1/24 428/340 |
| 2017/0335464 A1 | | 11/2017 | Yamazaki et al. | |
| 2017/0341107 A1 | | 11/2017 | Takahashi et al. | |
| 2017/0342568 A1 | | 11/2017 | Yamazaki et al. | |
| 2017/0342569 A1 | | 11/2017 | Takahashi et al. | |
| 2018/0155840 A1 | | 6/2018 | Yamazaki et al. | |

FOREIGN PATENT DOCUMENTS

| | | |
|---|---|---|
| EP | 4 063 534 A1 | 9/2022 |
| JP | 7-41913 A | 2/1995 |
| JP | 7-166365 A | 6/1995 |
| JP | 11-80971 A | 3/1999 |
| JP | 11-131250 A | 5/1999 |
| JP | 2001-129455 A | 5/2001 |
| JP | 2002-47576 A | 2/2002 |
| JP | 2002-69657 A | 3/2002 |
| JP | 2005-314725 A | 11/2005 |
| JP | 2008-303411 A | 12/2008 |
| JP | 2009-155707 A | 7/2009 |
| JP | 2009-545674 A | 12/2009 |
| JP | 2010-7140 A | 1/2010 |
| JP | 2010-261063 A | 11/2010 |
| JP | 2016-125141 A | 7/2016 |
| JP | 2016-125142 A | 7/2016 |
| JP | 2016-138333 A | 8/2016 |
| TW | 201710523 A | 3/2017 |
| WO | WO 2016/104404 A1 | 6/2016 |
| WO | WO 2016/104405 A1 | 6/2016 |
| WO | WO 2016/104407 A1 | 6/2016 |
| WO | WO 2016/104512 A1 | 6/2016 |
| WO | WO 2016/194520 A1 | 12/2016 |

* cited by examiner

*Primary Examiner* — Callie E Shosho
*Assistant Examiner* — Bethany M Miller
(74) *Attorney, Agent, or Firm* — Birch, Stewart, Kolasch & Birch, LLP

(57) ABSTRACT

A non-oriented electrical steel sheet according to one embodiment of this invention includes a base metal steel sheet and a composite coating film composed of a Zn-containing phosphate and an organic resin, the composite coating film being formed on a surface of the base metal steel sheet. A molar ratio of Zn to all metal components in the composite coating film is 10 mol % or more, and after the non-oriented electrical steel sheet is boiled for 20 minutes in boiled distilled water, an amount of soluble Zn in the distilled water is 1.0 mg/m$^2$ or more. The method for determining the amount of soluble Zn is in accordance with JIS K 0102: 2016 "Testing Methods for Industrial Wastewater", 53.3 "ICP Emission Spectroscopy".

10 Claims, 1 Drawing Sheet

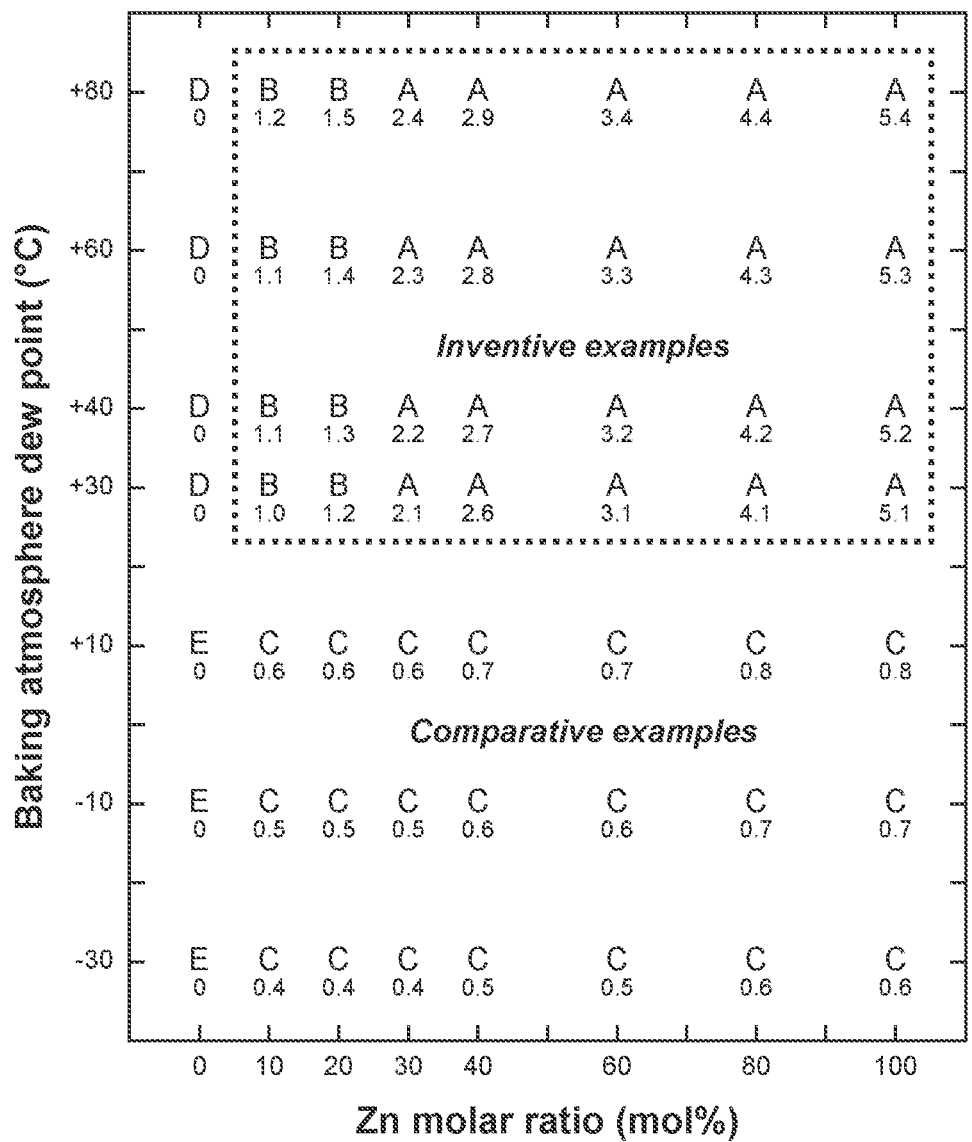

NON-ORIENTED ELECTRICAL STEEL SHEET AND METHOD FOR PRODUCING SAME

TECHNICAL FIELD

The present invention relates to a non-oriented electrical steel sheet, and a method for producing the same.

BACKGROUND ART

Non-oriented electrical steel sheets are used in the form of a so-called "laminate" that is formed by laminating a large number of steel sheets, as iron core material for motors. When non-oriented electrical steel sheets are used as an iron core for a motor, if a current referred to as an "eddy current" is induced in the normal direction of the surface of the laminated steel sheets, the efficiency of the motor decreases. Therefore, in order to prevent the generation of an eddy current, an insulating coating film is generally formed on the surface of the non-oriented electrical steel sheets.

In addition to preventing the generation of eddy currents, the insulating coating film also has a function of protecting the non-oriented electrical steel sheet itself which is constituted by elements composed mainly of iron from rusting, that is, against corrosion. Therefore, heretofore it has been common to form a chromate-based coating film having a strong corrosion-preventing action on the surface of non-oriented electrical steel sheets.

However, in recent years, with the increase in environmental consciousness, a large number of insulating coating films that do not use chromate compounds have been proposed. Among these proposed insulating coating films, a technique has been proposed in which "Zn" is adopted as one of the metal components in the coating solution serving as the material of the insulating coating film.

For example, Patent Document 1 discloses that a coating film agent containing one or more of Al phosphate, Ca phosphate, and Zn phosphate is used as an inorganic substance. Patent Document 2 discloses that an $Al_2O_3/H_3PO_4$ molar ratio, a $CaO/H_3PO_4$ molar ratio and a $ZnO/H_3PO_4$ molar ratio are defined with respect to Al phosphate, Ca phosphate and Zn phosphate, respectively, which are used as inorganic compounds in a coating. Patent Document 3 discloses the use of mono-aluminum phosphate and organic salts of Al, Mg, Ca and Zn. Patent Documents 4 to 6 disclose the use of a metal phosphate containing a Zn component.

The techniques mentioned above relate to inorganic components among the constituents of the coating film. On the other hand, as a technique that focuses on organic components among the constituents of a coating film, the use of a chelate-forming compound such as a phosphonic acid-based compound as a coating film constituent has also been proposed.

For example, Patent Document 7 discloses a technique in which a phosphonic acid-based or carboxylic acid-based chelate-forming compound is added to a coating solution. Patent Document 8 discloses a technique in which a phosphonic acid-based or carboxylic acid-based chelate-forming compound is used as a yellowing inhibitor. Patent Document 9 discloses a technique that uses hexafluorotitanic acid or hexafluorozirconic acid in addition to a phosphonic acid-based or carboxylic acid-based chelate-forming compound. Patent Document 10 discloses a technique in which a phosphonic acid-based or carboxylic acid-based chelate-forming compound is added to a coating solution. Patent Document 11 discloses a technique that uses a titanium chelate or the like. Patent Document 12 discloses a technique that uses a phosphonic acid-based or carboxylic acid-based chelate compound prior to coating after Ni-plating. Patent Document 13 discloses a technique in which a polyamine is added in addition to a phosphonic acid-based or carboxylic acid-based chelate-forming compound to a coating solution.

Furthermore, recently the following proposals have been made which further define the coating film structure on the premise that a phosphonic acid-based compound is used as a constituent of a coating solution for forming a coating film.

For example, Patent Document 14 discloses that the Fe area fraction in a cross section of a coating film determined using a transmission electron microscope or the like is defined. Patent Document 15 discloses that the relation between the ratio of P and the ratio of Fe bonded to O in a coating film which are determined by X-ray photoelectron spectroscopy is defined. Patent Document 16 discloses that the ratio of Fe/P in a coating film is defined. Patent Document 17 discloses that the integrated intensity ratio of P in nuclear magnetic resonance spectroscopy is defined. Patent Document 18 discloses that containing a carboxylic acid in a coating film is defined. Patent Document 19 discloses that the amount of phosphoric acid in a coating film is defined for each type. Patent Document 20 discloses that the ratio of $Fe^{3+}$ to the total amount of Fe in a coating film is defined. Patent Document 21 discloses that a concentrated amount of a divalent metal in a coating film is defined.

LIST OF PRIOR ART DOCUMENTS

Patent Documents

Patent Document 1: JP07-041913A
Patent Document 2: JP07-166365A
Patent Document 3: JP11-131250A
Patent Document 4: JP11-080971A
Patent Document 5: JP2001-129455A
Patent Document 6: JP2002-069657A
Patent Document 7: JP2002-47576A
Patent Document 8: JP2005-314725A
Patent Document 9: JP2008-303411A
Patent Document 10: JP2009-155707A
Patent Document 11: JP2009-545674A
Patent Document 12: JP2010-7140A
Patent Document 13: JP2010-261063A
Patent Document 14: WO 2016/104404
Patent Document 15: WO 2016/104405
Patent Document 16: WO 2016/104407
Patent Document 17: WO 2016/104512
Patent Document 18: JP2016-125141A
Patent Document 19: JP2016-125142A
Patent Document 20: JP2016-138333A
Patent Document 21: WO 2016/194520

SUMMARY OF INVENTION

Technical Problem

If an insulating coating film is formed on a non-oriented electrical steel sheet by applying the aforementioned technique using "Zn", a certain degree of corrosion resistance can be secured. However, in recent years, cases in which non-oriented electrical steel sheets are subjected to working in high-temperature and high-humidity environments as well as environments in which salt which is blown from the ocean adheres to the steel sheets are increasing. In such harsh steel sheet processing environments of high temperatures and high humidity as well as salt adhesion, even when "Zn" has been used as one of the metal components contained in the coating solution, and other various elemental technologies have been applied, it could not be said that the corrosion resistance was adequate. Generally, the thickness of a coating film on a non-oriented electrical steel sheet is around 1 which is disadvantageous from the viewpoint of securing corrosion resistance.

Further, if an insulating coating film is formed on a non-oriented electrical steel sheet by applying the above-mentioned technique using "phosphonic acids", a certain degree of corrosion resistance can be secured. However, when phosphonic acids are used as a component of a coating solution for formation of a coating film, there is the problem that the cost is high. Phosphonic acids are organic compounds which have a slightly complex chemical skeleton. Consequently, synthesis of phosphonic acids requires several steps. In the case of an organic substance, the greater that the number of synthesis steps is, the higher the cost of producing the organic substance becomes. The price competition with respect to non-oriented electrical steel sheets is intense, and the cost that can be spent on the coating solution for forming an insulating coating film is extremely limited. Therefore, inevitably there is a desire for the cost of the raw material used for formation of the coating film to be low.

In recognition of such issues, there has been a need to develop a coating film that can stably exhibit the excellent corrosion resistance of Zn without using expensive phosphonic acids, as well as a method for forming the coating film.

An object of the present invention is to solve the problems mentioned above, and to provide a non-oriented electrical steel sheet which is able to endure high-temperature and high-humidity environments as well as environments in which adherence of salt occurs (that is, a non-oriented electrical steel sheet which is excellent in salt spray corrosion resistance) even without using a chromate compound and an expensive organic compound typified by phosphonic acid as an insulating coating film material, as well as a method for producing the non-oriented electrical steel sheet.

Solution to Problem

The present invention has been made to solve the problems described above, and the gist of the present invention is a non-oriented electrical steel sheet and a method for producing the non-oriented electrical steel sheet which are described hereunder.

(1) A non-oriented electrical steel sheet according to one embodiment of the present invention includes a base metal steel sheet, and a composite coating film composed of a Zn-containing phosphate and an organic resin, the composite coating film being formed on a surface of the base metal steel sheet, wherein: a molar ratio of Zn to all metal components in the composite coating film is 10 mol % or more; and after boiling the non-oriented electrical steel sheet for 20 minutes in boiled distilled water, an amount of soluble Zn in the distilled water is 1.0 mg/m² or more. Here, a method for determining the amount of soluble Zn is in accordance with JIS K 0102: 2016 "Testing Methods for Industrial Wastewater", 53.3 "ICP Emission Spectroscopy".

(2) In the non-oriented electrical steel sheet according to (1) above, the metal components of the composite coating film may further include one or more elements selected from the group consisting of Al, Mg and Ca.

(3) In the non-oriented electrical steel sheet according to (1) or (2) above, the organic resin may include one or more resins selected from the group consisting of an acrylic resin, a styrene resin, an acrylic-styrene resin, an epoxy resin, a polyester resin, a phenol resin and a urethane resin.

(4) A method for producing a non-oriented electrical steel sheet according to another embodiment of the present invention is a method for producing a non-oriented electrical steel sheet according to any one of (1) to (3) above, including:

a step of applying a coating solution to a surface of a base metal steel sheet, the coating solution containing a Zn-containing phosphate in which a molar ratio of Zn to all metal components is 10 mol % or more and an organic resin, and thereafter, a step of forming the composite coating film on the base metal steel sheet by baking the coating solution under an atmosphere with a dew point of +30° C. or more.

(5) In the method for producing a non-oriented electrical steel sheet according to (4) above, the coating solution may further contain one or more elements selected from the group consisting of Al, Mg and Ca.

(6) In the method for producing a non-oriented electrical steel sheet according to (4) or (5) above, the organic resin may be one or more resins selected from the group consisting of an acrylic resin, a styrene resin, an acrylic-styrene resin, an epoxy resin, a polyester resin, a phenol resin and a urethane resin.

(7) In the method for producing a non-oriented electrical steel sheet according to any one of (4) to (6) above, an end-point temperature when baking the coating solution may be within a range of 200 to 450° C.

Advantageous Effects of Invention

According to the present invention, a non-oriented electrical steel sheet that is excellent in salt spray corrosion resistance can be produced, in which the excellent corrosion resistance that Zn possesses can be exhibited to the maximum even without using a chromate compound and an expensive organic compound typified by phosphonic acid as the material of an insulating coating film.

BRIEF DESCRIPTION OF DRAWING

FIG. 1 is a view illustrating results of evaluating salt spray corrosion resistance as well as amount of soluble Zn when coating solutions containing phosphate with different Zn ratios were baked in atmospheres with different dew points.

DESCRIPTION OF EMBODIMENT

In order to obtain a non-oriented electrical steel sheet that is excellent in salt spray corrosion resistance, the present inventors conducted intensive studies with respect to a method for exhibiting to the maximum the excellent corrosion resistance which Zn possesses, and performed a preliminary test that is described hereunder.

First, the present inventors investigated the influence that a Zn molar ratio in a phosphate has on salt spray corrosion resistance.

Non-oriented electrical steel sheets which had been annealed but on which an insulating coating film had not been formed (that is, base metal steel sheets) were prepared. A mixed solution composed of 100 g of an aqueous phosphate solution having a solid content concentration of 50% by mass in which the Zn molar ratio was adjusted within the range of 0 to 100% with Al phosphate, Zn phosphate or a mixture of these, and 40 g of an aqueous dispersion of acrylic-styrene-based organic resin with a concentration of 30% was applied to these base metal steel sheets.

An insulating coating film was then formed on the respective sheets by baking the coating solution, with the end-point temperature during baking being set to 340° C. The amount of insulating coating film was set so as to be 1.5 g/m² per side. Next, evaluation of the corrosion resistance was performed by the salt spray test using these steel sheets (non-oriented electrical steel sheets) with an insulating coating film.

The salt spray corrosion resistance test was performed in accordance with JIS Z 2371: 2015 "Methods of Salt Spray Testing". The NaCl concentration of the salt solution for the test was 5% by mass. The temperature in the vicinity of the test specimen retainer in the spray chamber was set to 35° C. The corrosion resistance was evaluated by adopting the red rust area ratio of each non-oriented electrical steel sheet at the time point at which the spraying time reached 32 hours as an index, and levels were classified as described hereunder. Table 1 shows the salt spray corrosion resistance evaluation results.

(Criteria for corrosion resistance evaluation by salt spray test) When red rust did not occur at all: A When red rust area ratio is less than 10%: B When red rust area ratio is 10% or more and less than 20%: C When red rust area ratio is 20% or more and less than 40%: D When red rust area ratio is 40% or more: E

TABLE 1

| Test No. | Zn molar ratio (%) | Salt spray corrosion resistance | |
|---|---|---|---|
| | | Rust area ratio (%) | Evaluation |
| 1 | 0 | 30 | D |
| 2 | 10 | 4 | B |
| 3 | 20 | 3 | B |
| 4 | 30 | 0 | A |
| 5 | 40 | 0 | A |
| 6 | 60 | 0 | A |
| 7 | 80 | 0 | A |
| 8 | 100 | 0 | A |

As will be understood from the results in Table 1, when an insulating coating film was formed using a mixed solution containing a Zn-free Al phosphate as a main component, the rust area ratio was 30% and the salt spray corrosion resistance was noticeably poor. On the other hand, when the Zn molar ratio in the mixed solution was 10% or more, the rust area ratio was less than 10% (B) or no rust at all was observed (A), and thus the salt spray corrosion resistance was good.

However, the results of subsequent studies revealed that even when the Zn molar ratio in the mixed solution is 10% or more, the rust area ratio may be 10% or more in some cases, indicating that large variations arise in the results. Therefore, the present inventors conducted further investigations regarding the influence that the production conditions have on salt spray corrosion resistance. Based on the test results described hereunder, the present inventors discovered that the dew point of atmosphere when baking a coating solution containing Zn as a metal component on a base metal steel sheet has a significant influence on salt spray corrosion resistance.

A large number of non-oriented electrical steel sheets which had been annealed but on which an insulating coating film had not been formed (that is, base metal steel sheets) were prepared. A mixed solution composed of 100 g of an aqueous phosphate solution having a solid content concentration of 50% by mass in which the Zn molar ratio was 10% and the Al molar ratio was 90%, and 40 g of an aqueous dispersion of acrylic-styrene-based organic resin with a concentration of 30% by mass was applied to these base metal steel sheets.

Subsequently, an insulating coating film was formed on the base metal steel sheets by applying various dew points of atmospheres and setting 340° C. as the end-point temperature when baking the coating solution. The amount of insulating coating film was set so as to be 1.5 g/m² per side. Next, evaluation of the corrosion resistance was performed by the salt spray test using these steel sheets (non-oriented electrical steel sheets) with an insulating coating film. The conditions and evaluation criteria adopted for the salt spray corrosion resistance test were the same as described above. The salt spray corrosion resistance evaluation results are shown in Table 2.

TABLE 2

| Test No. | Baking atmosphere dew point (° C.) | Salt spray corrosion resistance | | Amount of soluble Zn (mg/m²) |
|---|---|---|---|---|
| | | Rust area ratio (%) | Evaluation | |
| 9 | +80 | 3 | B | 1.2 |
| 10 | +60 | 4 | B | 1.1 |
| 11 | +40 | 4 | B | 1.1 |
| 12 | +30 | 5 | B | 1.0 |
| 13 | +10 | 12 | C | 0.6 |
| 14 | −10 | 15 | C | 0.5 |
| 15 | −30 | 18 | C | 0.4 |

As will be understood from the results shown in Table 2, the salt spray corrosion resistance determined for non-oriented electrical steel sheets obtained under a condition of a dew point of atmosphere of +10° C. or less was "C", which is not good. On the other hand, the salt spray corrosion resistance determined under a condition of a dew point of atmosphere of +30° C. or more was consistently "B", which is good. Based on these results, it was inferred that the properties of the insulating coating film changed depending on the dew point of atmosphere, and as a result the salt spray corrosion resistance of the non-oriented electrical steel sheet changed.

The present inventors performed various evaluations with respect to the insulating coating films in order to clarify the factors that cause the salt spray corrosion resistance to be good. As a result, the present inventors discovered that by boiling a non-oriented electrical steel sheet with an insulating coating film in boiled distilled water for 20 minutes, the amount of soluble Zn in the distilled water (hereunder, also referred to simply as "amount of soluble Zn") and the salt spray corrosion resistance show a favorable correlation.

What should be noted here is that the greater the amount of soluble Zn is, the higher the corrosion resistance will be. Normally, a coating film having a large amount of components dissolved by boiling is considered to have low stability and low corrosion resistance. The insulating coating film of the non-oriented electrical steel sheet according to the present embodiment is, contrary to this common general technical knowledge, a coating film for which the corrosion resistance increases as the amount of soluble Zn increases.

Steel sheets on which a coating film was provided on both the front and rear surfaces were boiled for 20 minutes in boiled distilled water, and the amount of soluble Zn which was dissolved in the distilled water are also shown in Table 2 above. Note that, the amount of soluble Zn was measured in accordance with JIS K 0102: 2016 "Testing Methods for Industrial Wastewater", 53.3 "ICP Emission Spectroscopy". Each steel sheet to be boiled had a rectangular shape of 40 mm in length and 50 mm in width (the total coating film area for the front and rear sides was 0.04 m×0.05 m×2=0.004 m$^2$), and the amount of distilled water was set to 75 ml. This boiling condition was also similarly adopted for other measurements of amount of soluble Zn.

As shown in Table 2, in the case of a condition of a dew point of atmosphere of +10° C. or less, the amount of soluble Zn was a small amount of 0.6 mg/m$^2$ or less, and as mentioned above, the salt spray corrosion resistance was also determined as "C", which is not good. On the other hand, in the case of a condition of a dew point of atmosphere of +30° C. or more, the amount of soluble Zn was a large amount of 1.0 mg/m$^2$ or more, and the salt spray corrosion resistance was determined as "B", which is good.

As described above, it was found that by baking the coating solution under a condition of a dew point of atmosphere of +30° C. or more, the salt spray corrosion resistance is good, and at such time the amount of soluble Zn becomes 1.0 mg/m$^2$ or more. Note that, the present inventors surmise that in a case where the dew point of atmosphere is higher than +80° C. also, the salt spray corrosion resistance will not decrease.

Although the reason why a correlation is observed between the salt spray corrosion resistance and the amount of soluble Zn is not clear, the present inventors consider that it is the result of the following mechanism. First, when a steel sheet with an insulating coating film is exposed to a saltwater corrosive environment, initially moisture and salt content come into contact with the insulating coating film. It is presumed that at such time, as a result of the moisture coming in contact with the insulating coating film, some of the insulating coating film components dissolve, and insulating coating film components that were dissolved in the moisture form some kind of corrosion product.

In general, it is considered that the corrosion resistance of a steel sheet is determined by the quality of such a corrosion product. In other words, a corrosion product that suppresses the permeation of moisture and salt content and the like blocks moisture and salt content and the like from coming in contact with and penetrating into the steel sheet itself. Therefore, such a corrosion product suppresses corrosion of the steel sheet itself, and as a result, contributes to suppressing the occurrence of rust in the salt spray test. In this regard, a corrosion product for which an action of suppressing permeation of moisture and salt content and the like is low does not have the ability to sufficiently block moisture and salt content and the like from coming in contact with and penetrating into the steel sheet itself. Consequently, such a corrosion product cannot suppress the propagation of corrosion of the steel sheet itself, and as a result, in the salt spray test, the dissolution of base metal and the occurrence of rust cannot be sufficiently prevented.

In this respect, in general, a corrosion product containing Zn forms a corrosion product that is excellent in corrosion resistance. When moisture and salt content or the like come in contact with an insulating coating film containing Zn, there is a good possibility that the Zn component will be dissolved from the insulating coating film into the moisture. In fact, when an insulating coating film containing Zn is boiled in water, Zn is dissolved into the water. The present inventors consider that the amount of Zn that is dissolved into the water may correspond to the ease of generation of corrosion products that are formed on the insulating coating film surface when an insulating coating film containing Zn is placed in a wet environment that includes water in the salt spray test.

In other words, it is considered that because the ability of an insulating coating film for which the amount of soluble Zn is 1.0 mg/m$^2$ or more to form a corrosion product with favorable corrosion resistance that contains Zn is high, such an insulating coating film is excellent in corrosion resistance and can suppress red rust occurrence to a small amount. On the other hand, it is considered that since the ability of an insulating coating film for which the amount of soluble Zn is less than 1.0 mg/m$^2$ to form a corrosion product containing Zn for maintaining corrosion resistance is low, such an insulating coating film is poor in corrosion resistance, and thus there is a marked amount of red rust occurrence.

Whilst the reason why a correlation is observed between the dew point of atmosphere during baking and the amount of soluble Zn is also not clear, the present inventors consider that the reason may be that the interaction between the insulating coating film and moisture changes depending on how high or low the dew point of baking atmosphere is.

The dew point will now be described further. The dew point is an index that indicates the amount of water vapor contained in a certain atmosphere, and is expressed in degrees Celsius (° C.) or the like. The amount of moisture contained in an atmosphere having a certain dew point is equivalent to the amount of saturated water vapor in an atmosphere having a temperature of the same value as the relevant dew point. An atmosphere with a low dew point means that the amount of moisture contained in the atmosphere is small, and an atmosphere with a high dew point means that the amount of moisture contained in the atmosphere is large.

When baking, since it is necessary to cause the moisture in the coating solution to evaporate, it is common to lower the dew point of atmosphere. However, it is considered that in a case where the coating solution is baked by controlling the dew point of atmosphere during baking to be low, the ability of the formed insulating coating film to form corrosion products will be low. In a case where a steel sheet with an insulating coating film which has a low ability to form corrosion products is placed in a wet environment such as a salt spray test environment, it is presumed that because it is difficult for a reaction that forms a corrosion product to proceed between moisture and the coating film, it is difficult for a corrosion product that has favorable corrosion resistance which contains Zn to be formed, and dissolution of base metal propagates, which leads to red rust occurrence.

On the other hand, in a case where an insulating coating film is formed by controlling the dew point of baking atmosphere to +30° C. or more, in a wet environment such as a salt spray test environment it is easy for a reaction that forms a corrosion product to proceed between moisture and the coating film. It is presumed that, as a result, a corrosion product that has favorable corrosion resistance which contains Zn is easily formed, and dissolution of base metal does not propagate, and it is difficult for red rust to occur.

The present invention has been made based on the above findings. The respective requirements of the present invention are described hereunder.

1. Non-Oriented Electrical Steel Sheet

A non-oriented electrical steel sheet according to the present embodiment includes a base metal steel sheet, and an insulating coating film that is formed on a surface of the base metal steel sheet. In general, insulating coating films of non-oriented electrical steel sheets are roughly classified into the following three kinds: purely organic coating films (entire coating film is composed of organic substances); inorganic coating films (entire coating film is composed of inorganic substances); and composite coating films (coating film is composed of a combination of organic substances and inorganic substances; this kind of coating film is also called a "semi-organic coating film"). The insulating coating film of the non-oriented electrical steel sheet according to the present embodiment is a composite coating film.

Further, phosphate, colloidal silica, alumina sol, zirconia sol and the like have been proposed as inorganic substances in the composite coating films. In the present invention, only phosphate is contained as an inorganic substance, and an inorganic substance other than phosphate, such as colloidal silica, alumina sol, or zirconia sol is not contained. Since the present invention is based on the technical idea that, as described above, corrosion resistance is improved by dissolving a Zn component, a Zn-containing phosphate is essential. In other words, in the present invention, the composite coating film contains a Zn-containing phosphate and an organic resin.

2. Composite Coating Film

In the non-oriented electrical steel sheet according to the present embodiment, the molar ratio of Zn to all the metal components in the composite coating film formed on the surface of the base metal steel sheet is 10 mol % or more. As described above, by making the Zn molar ratio in the phosphate 10 mol % or more, excellent salt spray corrosion resistance is obtained. The Zn molar ratio is preferably 20 mol % or more, and more preferably is 30 mol % or more. Note that, although the Zn among the metal components of the composite coating film is, in principle, derived from Zn-containing phosphate, the Zn may also be derived from other components.

The balance of the metal components in the composite coating film is not particularly limited. As long as the molar ratio of Zn to all the metal components is 10 mol % or more, even when metal components other than Zn are contained in the composite coating film, the formation of a Zn-containing corrosion product having high corrosion resistance is not hindered. Examples of elements constituting the balance of the metal components include, but not limited to, one or more elements selected from the group consisting of Al, Mg and Ca. Note that, when taking environmental loads into consideration, it is not preferable for the composite coating film to contain a chromate compound or a substance derived therefrom. The content of a chromate compound and a substance derived therefrom should be reduced as much as possible so as to meet environmental standards, and preferably the content is 0% by mass.

A method for measuring the molar ratio of Zn to all metal components in the composite coating film is as described hereunder. First, a steel sheet with a coating film having predetermined dimensions is immersed in an acid solution, for example, a mixed solution of bromine and methanol to dissolve the steel sheet components. At this time, ultrasonic waves may be irradiated to promote dissolution and shorten the immersion time. When dissolution of the steel sheet portion is completed, only the coating film components are filtered and collected. The filtration residue, that is, the coating film components, is subjected to acid treatment or alkali treatment to obtain a solution. The contents of the metal components including Zn in the obtained solution are then measured by the ICP method, and the molar ratio of Zn to all of the metal components can be determined.

Further, an amount of soluble Zn when the non-oriented electrical steel sheet according to the present embodiment is boiled for 20 minutes in boiling water is 1.0 mg/m$^2$ or more.

As described above, a correlation is observed between the amount of soluble Zn and the salt spray corrosion resistance, and the higher the amount of soluble Zn is, the more excellent the salt spray corrosion resistance which is obtained. The amount of soluble Zn is preferably 1.3 mg/m$^2$ or more, more preferably is 1.5 mg/m$^2$ or more, and further preferably is 2.0 mg/m$^2$ or more.

Note that, with regard to measurement of the amount of soluble Zn, the method for determining the amount of soluble Zn is performed in accordance with JIS K 0102: 2016 "Testing Methods for Industrial Wastewater", 53.3 "ICP Emission Spectroscopy".

The thickness of the composite coating film of the non-oriented electrical steel sheet according to the present embodiment is also not particularly limited, and the thickness may be a usual thickness that is applied for an insulating coating film for a non-oriented electrical steel sheet. From the viewpoint of preventing the generation of eddy currents, the usual thickness of the composite coating film of the non-oriented electrical steel sheet is preferably, for example, 0.2 µm or more, 0.3 µm or more, or 0.5 µm or more.

On the other hand, from the viewpoint of keeping down the production cost of the non-oriented electrical steel sheet, the thinner that the thickness of the composite coating film is, the more preferable it is. Since the composite coating film of the non-oriented electrical steel sheet according to the present embodiment has excellent corrosion resistance because of having the composition described above, even if the thickness of the composite coating film is thin, it is possible to adequately suppress corrosion of the non-oriented electrical steel sheet.

Further, as described above, the composite coating film of the non-oriented electrical steel sheet according to the present embodiment contains a Zn-containing phosphate and an organic resin. The kind of the organic resin is not particularly limited, and any known organic resin for constituting an insulating coating film of a non-oriented electrical steel sheet may be adopted. Since the corrosion resistance of the non-oriented electrical steel sheet according to the present embodiment is secured by Zn-containing corrosion products, the corrosion resistance is not affected by the kind of organic resin that is used.

One or more resins selected from the group consisting of an acrylic resin, a styrene resin, an acrylic-styrene resin, an epoxy resin, a polyester resin, a phenol resin and a urethane resin may be mentioned as examples of the organic resin. Further, the ratio between the Zn-containing phosphate and the organic resin is also not particularly limited. This is because, as long as the amount of soluble Zn is 1.0 mg/m$^2$ or more, an amount of Zn that is sufficient for securing corrosion resistance will be contained in the insulating coating film.

3. Base Metal Steel Sheet

The base metal steel sheet of the non-oriented electrical steel sheet according to the present embodiment is not particularly limited. This is because improvement of corrosion resistance that is the task of the non-oriented electrical steel sheet according to the present embodiment is achieved by means of the aforementioned characteristics of the insulating coating film. The base metal steel sheet can be appropriately selected from among steel sheets that usually used as base metal steel sheets of non-oriented electrical steel sheets.

4. Production Method

The non-oriented electrical steel sheet according to the present embodiment can be produced by a production method that includes a step of applying a coating solution to a surface of the base metal steel sheet, and thereafter, a step of forming an insulating coating film on the base metal steel sheet by baking the coating solution.

4-1. Coating Solution

The coating solution to be applied to the surface of the base metal steel sheet contains an aqueous phosphate solution and an aqueous dispersion of organic resin. Further, a Zn component is included in the metal components in the aqueous phosphate solution. However, as described above, the molar ratio of Zn to all of the metal components must be 10% or more. In view of the raw material price, availability and the like, examples of the metal components other than Zn include, but not limited to, Al, Mg, Ca and the like.

The kind of the organic resin is not particularly limited. Any kind of organic resin can be used as long as the resin does not form coarse agglomerates when mixed with an aqueous phosphate solution. Examples of a preferable organic resin include one or more resins selected from the group consisting of an acrylic resin, a styrene resin, an acrylic-styrene resin, an epoxy resin, a polyester resin, a phenol resin and a urethane resin.

The ratio between the aqueous phosphate solution and the aqueous dispersion of organic resin can be arbitrarily selected. A non-oriented electrical steel sheet on which an insulating coating film has been formed using a coating solution that does not contain an aqueous dispersion of organic resin tends to be poor in punchability. Therefore, it is better to include an aqueous dispersion of organic resin in the coating solution. The blending ratio of the aqueous phosphate solution and the aqueous dispersion of organic resin may be determined in consideration of the solid content concentration of each. This is because, as long as the blending ratio is controlled so that the aforementioned amount of soluble Zn is within a predetermined range, the insulating coating film will contain a sufficient amount of Zn for securing corrosion resistance irrespective of the blending ratio, and a non-oriented electrical steel sheet having good corrosion resistance will be obtained.

For example, in a case where the ratio of the organic resin solid content to the phosphate solid content is 3% by mass or more, the punchability of the non-oriented electrical steel sheet that is ultimately obtained is further improved, which is preferable. On the other hand, in a case where the ratio of the organic resin solid content to the phosphate solid content is 25% by mass or less, the raw material cost can be suppressed, which is preferable. Accordingly, the ratio of the organic resin solid content to the phosphate solid content may be defined as a ratio within the range of 3 to 25% by mass. In a case where there is a problem with the wettability of the steel sheet, a surfactant may be additionally added to the coating solution.

Note that, from the viewpoint of reduction of environmental loads, it is not preferable to contain a chromate compound in the aforementioned mixed solution.

4-2. Baking Conditions

As described above, control of the dew point of atmosphere is important when baking the prepared coating solution. Specifically, by setting the dew point of atmosphere to +30° C. or more, the amount of soluble Zn markedly increases, and as a result, excellent salt spray corrosion resistance is obtained. Setting the dew point of atmosphere to +40° C. or more is further preferable since the amount of soluble Zn additionally increases.

Whilst the temperature at which to bake the prepared coating solution is not particularly limited, for example, setting the temperature within the range of 200 to 450° C. is preferable. If the temperature is lower than 200° C., there is a possibility that the insulating coating film will become sticky, and when the non-oriented electrical steel sheets are stacked, they may adhere to each other. On the other hand, if the baking temperature is higher than 450° C., there is a possibility that the resin component in the insulating coating film will disappear and the punchability of the non-oriented electrical steel sheet will deteriorate. The baking temperature is more preferably set within the range of 250 to 400° C.

Whilst the time for which to bake the prepared coating solution is not particularly limited, for example, setting the time within the range of 5 to 120 seconds is preferable. If the baking time is shorter than 5 seconds, there is a possibility that the insulating coating film will become sticky, and when the non-oriented electrical steel sheets are stacked, they may adhere to each other. On the other hand, if the baking time is longer than 120 seconds, there is a possibility that the resin component in the insulating coating film will disappear and the punchability of the non-oriented electrical steel sheet will deteriorate. The baking time is more preferably set within the range of 10 to 60 seconds.

Hereunder, the present invention is described more specifically by way of examples, although the present invention is not limited to these examples.

EXAMPLES

Non-oriented electrical steel sheets which had been annealed but on which an insulating coating film had not been formed (that is, base metal steel sheets) were prepared. Mixed solutions composed of 100 g of an aqueous phosphate solution having a solid content concentration of 50% which had various Zn molar ratios, and 40 g of an aqueous dispersion of acrylic-styrene-based organic resin with a concentration of 30% by mass were applied to the steel sheets, respectively, and an insulating coating film was formed on the respective sheets by baking the coating solution at various dew points of atmospheres, with the end-point temperature during baking being set to 340° C. The amount of insulating coating film was set so as to be 1.5 g/m$^2$ per side.

Next, evaluation of the corrosion resistance was performed by the salt spray test with respect to these steel sheets with an insulating coating film (non-oriented electrical steel sheets). The salt spray corrosion resistance test was performed in accordance with JIS Z 2371: 2015 "Methods of Salt Spray Testing". The NaCl concentration of the salt solution for the test was 5% by mass. The temperature in the vicinity of the test specimen retainer in the spray chamber was set to 35° C. The corrosion resistance was evaluated by adopting the red rust area ratio of each non-oriented electrical steel sheet at the time point at which the spraying time reached 32 hours as an index, and levels were classified as described hereunder.

(Criteria for corrosion resistance evaluation by salt spray test)

When red rust did not occur at all: A

When red rust area ratio is less than 10%: B

When red rust area ratio is 10% or more and less than 20%: C

When red rust area ratio is 20% or more and less than 40%: D

When red rust area ratio is 40% or more: E

In addition, after boiling the respective non-oriented electrical steel sheets for 20 minutes in boiled distilled water, the amount of soluble Zn in the distilled water was measured.

Note that, the amount of soluble Zn was measured in accordance with JIS K 0102: 2016 "Testing Methods for Industrial Wastewater", 53.3 "ICP Emission Spectroscopy". Each steel sheet to be boiled had a rectangular shape of 40 mm in length and 50 mm in width (the total coating film area for the front and rear sides was 0.04 m×0.05 m×2=0.004 m$^2$), and the amount of distilled water was set to 75 mL.

The results of the above evaluations and measurements are shown in Table 3 and Table 4 as well as FIG. 1. FIG. 1 was obtained by plotting the results for Test Numbers 16 to 71 shown in Table 3 and Table 4 by representing the Zn molar ratio on the ordinate and representing the dew point of baking atmosphere on the ordinate. The characters "E", "D", "C", "B" and "A" in Table 3 and Table 4 as well as FIG. 1 represent judgment results with respect to evaluation of the corrosion resistance by the salt spray test. The numerical value shown below each judgment in FIG. 1 shows the amount of soluble Zn.

TABLE 3

| Test No. | Zn molar ratio (%) | Baking atmosphere dew point (° C.) | Amount of soluble Zn (mg/m$^2$) | Salt spray corrosion resistance Rust area ratio (%) | Evaluation | Remarks |
|---|---|---|---|---|---|---|
| 16 | 0 | −30 | 0 | 80 | E | Comparative example |
| 17 | 0 | −10 | 0 | 60 | E | |
| 18 | 0 | +10 | 0 | 50 | E | |
| 19 | 0 | +30 | 0 | 35 | D | |
| 20 | 0 | +40 | 0 | 30 | D | |
| 21 | 0 | +60 | 0 | 25 | D | |
| 22 | 0 | +80 | 0 | 25 | D | |
| 23 | 10 | −30 | 0.4 | 18 | C | |
| 24 | 10 | −10 | 0.5 | 15 | C | |
| 25 | 10 | +10 | 0.6 | 15 | C | |
| 26 | 10 | +30 | 1.0 | 5 | B | Inventive example |
| 27 | 10 | +40 | 1.1 | 4 | B | |
| 28 | 10 | +60 | 1.1 | 4 | B | |
| 29 | 10 | +80 | 1.2 | 3 | B | |
| 30 | 20 | −30 | 0.4 | 16 | C | Comparative example |
| 31 | 20 | −10 | 0.5 | 14 | C | |
| 32 | 20 | +10 | 0.6 | 14 | C | |
| 33 | 20 | +30 | 1.2 | 3 | B | Inventive example |
| 34 | 20 | +40 | 1.3 | 3 | B | |
| 35 | 20 | +60 | 1.4 | 3 | B | |
| 36 | 20 | +80 | 1.5 | 3 | B | |
| 37 | 30 | −30 | 0.4 | 15 | C | Comparative example |
| 38 | 30 | −10 | 0.5 | 13 | C | |
| 39 | 30 | +10 | 0.6 | 13 | C | |
| 40 | 30 | +30 | 2.1 | 0 | A | Inventive example |
| 41 | 30 | +40 | 2.2 | 0 | A | |
| 42 | 30 | +60 | 2.3 | 0 | A | |
| 43 | 30 | +80 | 2.4 | 0 | A | |

TABLE 4

| Test No. | Zn molar ratio (%) | Baking atmosphere dew point (° C.) | Amount of soluble Zn (mg/m$^2$) | Salt spray corrosion resistance Rust area ratio (%) | Evaluation | Remarks |
|---|---|---|---|---|---|---|
| 44 | 40 | −30 | 0.5 | 14 | C | Comparative example |
| 45 | 40 | −10 | 0.6 | 12 | C | |
| 46 | 40 | +10 | 0.7 | 12 | C | |
| 47 | 40 | +30 | 2.6 | 0 | A | Inventive example |
| 48 | 40 | +40 | 2.7 | 0 | A | |
| 49 | 40 | +60 | 2.8 | 0 | A | |
| 50 | 40 | +80 | 2.9 | 0 | A | |
| 51 | 60 | −30 | 0.5 | 13 | C | Comparative example |
| 52 | 60 | −10 | 0.6 | 12 | C | |
| 53 | 60 | +10 | 0.7 | 12 | C | |
| 54 | 60 | +30 | 3.1 | 0 | A | Inventive example |
| 55 | 60 | +40 | 3.2 | 0 | A | |
| 56 | 60 | +60 | 3.3 | 0 | A | |
| 57 | 60 | +80 | 3.4 | 0 | A | |
| 58 | 80 | −30 | 0.6 | 12 | C | Comparative example |
| 59 | 80 | −10 | 0.7 | 11 | C | |
| 60 | 80 | +10 | 0.8 | 11 | C | |
| 61 | 80 | +30 | 4.1 | 0 | A | Inventive example |
| 62 | 80 | +40 | 4.2 | 0 | A | |
| 63 | 80 | +60 | 4.3 | 0 | A | |
| 64 | 80 | +80 | 4.4 | 0 | A | |
| 65 | 100 | −30 | 0.6 | 11 | C | Comparative example |
| 66 | 100 | −10 | 0.7 | 10 | C | |
| 67 | 100 | +10 | 0.8 | 10 | C | |
| 68 | 100 | +30 | 5.1 | 0 | A | Inventive example |
| 69 | 100 | +40 | 5.2 | 0 | A | |
| 70 | 100 | +60 | 5.3 | 0 | A | |
| 71 | 100 | +80 | 5.4 | 0 | A | |

Based on Table 3 and Table 4 as well as FIG. 1, it is found that the salt spray corrosion resistance of non-oriented electrical steel sheets for which the Zn molar ratio is 10% or more and the amount of soluble Zn is 1.0 mg/m$^2$ or more, that is, non-oriented electrical steel sheets produced under a condition in which the dew point of baking atmosphere is +30° C. or more, is good.

INDUSTRIAL APPLICABILITY

According to the present invention, a non-oriented electrical steel sheet that is excellent in salt spray corrosion resistance can be produced, in which the excellent corrosion resistance that Zn possesses can be exhibited to the maximum even without using a chromate compound and an expensive organic compound typified by phosphonic acid as the material of an insulating coating film.

The invention claimed is:

1. A non-oriented electrical steel sheet, comprising:
   a base metal steel sheet, and
   a composite coating film composed of a Zn-containing phosphate and an organic resin, the composite coating film being formed on a surface of the base metal steel sheet,
   wherein:
   a molar ratio of Zn to all metal components in the composite coating film is 10 mol % or more, and
   after boiling the non-oriented electrical steel sheet for 20 minutes in boiled distilled water, an amount of soluble Zn in the distilled water is 1.0 mg/m2 or more;
   where, a method for determining the amount of soluble Zn is in accordance with JIS K 0102:2016 "Testing Methods for Industrial Wastewater", 53.3 "ICP Emission Spectroscopy".

2. The non-oriented electrical steel sheet according to claim 1, wherein:
   the metal components of the composite coating film further include one or more of Al, Mg and Ca.

3. The non-oriented electrical steel sheet according to claim 1, wherein:
   the organic resin includes one or more of an acrylic resin, a styrene resin, an acrylic-styrene resin, an epoxy resin, a polyester resin, a phenol resin and a urethane resin.

4. A method for producing a non-oriented electrical steel sheet according to claim 1, comprising:
   a step of applying a coating solution to a surface of a base metal steel sheet, the coating solution containing a Zn-containing phosphate in which a molar ratio of Zn to all metal components is 10 mol % or more and an organic resin, and
   thereafter, a step of forming the composite coating film on the base metal steel sheet by baking the coating solution under an atmosphere with a dew point of +30° C. or more.

5. The method for producing a non-oriented electrical steel sheet according to claim 4, wherein:
   the coating solution further contains one or more of Al, Mg and Ca.

6. The method for producing a non-oriented electrical steel sheet according to claim 4, wherein:
   the organic resin is one or more of an acrylic resin, a styrene resin, an acrylic-styrene resin, an epoxy resin, a polyester resin, a phenol resin and a urethane resin.

7. The method for producing a non-oriented electrical steel sheet according to claim 4, wherein:
   an end-point temperature when baking the coating solution is within a range of 200 to 450° C.

8. A non-oriented electrical steel sheet, comprising:
   a base metal steel sheet, and a composite coating film comprises a Zn-containing phosphate and an organic resin, the composite coating film being formed on a surface of the base metal steel sheet,
   wherein:
   a molar ratio of Zn to all metal components in the composite coating film is 10 mol % or more, and
   after boiling the non-oriented electrical steel sheet for 20 minutes in boiled distilled water, an amount of soluble Zn in the distilled water is 1.0 mg/m$^2$ or more;
   where, a method for determining the amount of soluble Zn is in accordance with JIS K 0102:2016 "Testing Methods for Industrial Wastewater", 53.3 "ICP Emission Spectroscopy".

9. The non-oriented electrical steel sheet according to claim 8, wherein:
   the metal components of the composite coating film further include one or more of Al, Mg and Ca.

10. The non-oriented electrical steel sheet according to claim 8, wherein:
   the organic resin includes one or more of an acrylic resin, a styrene resin, an acrylic-styrene resin, an epoxy resin, a polyester resin, a phenol resin and a urethane resin.

* * * * *